Figure 7:
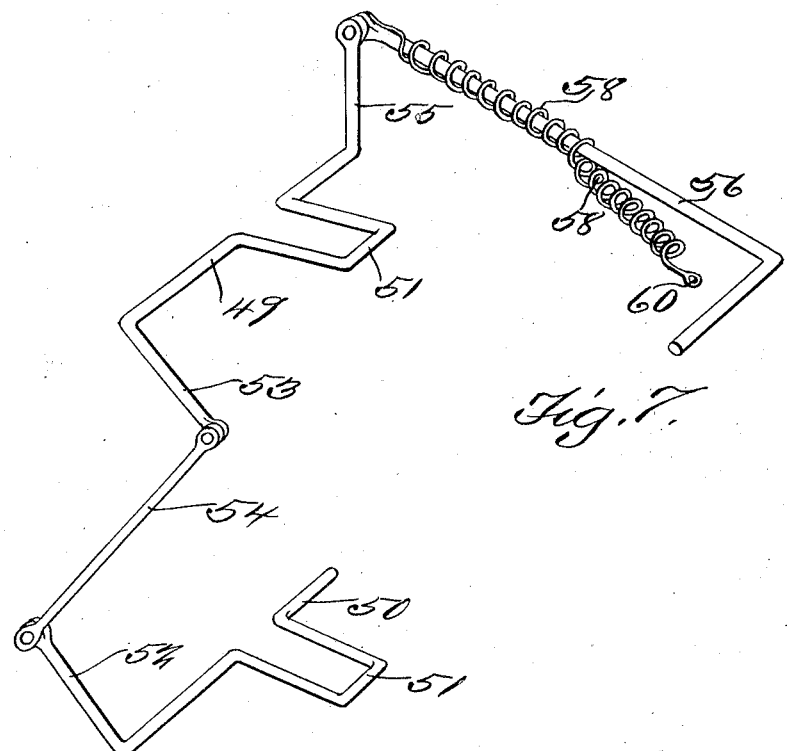

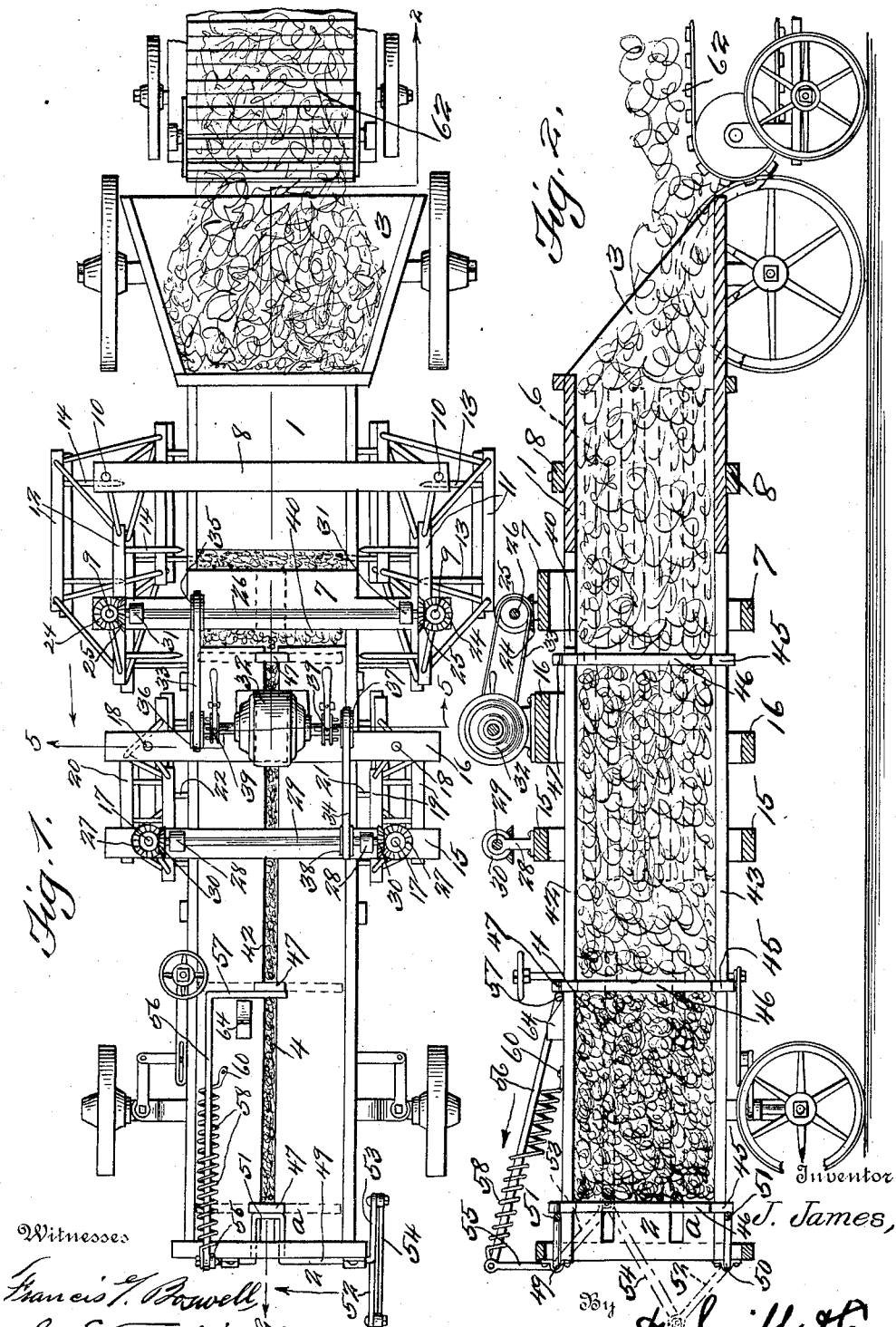

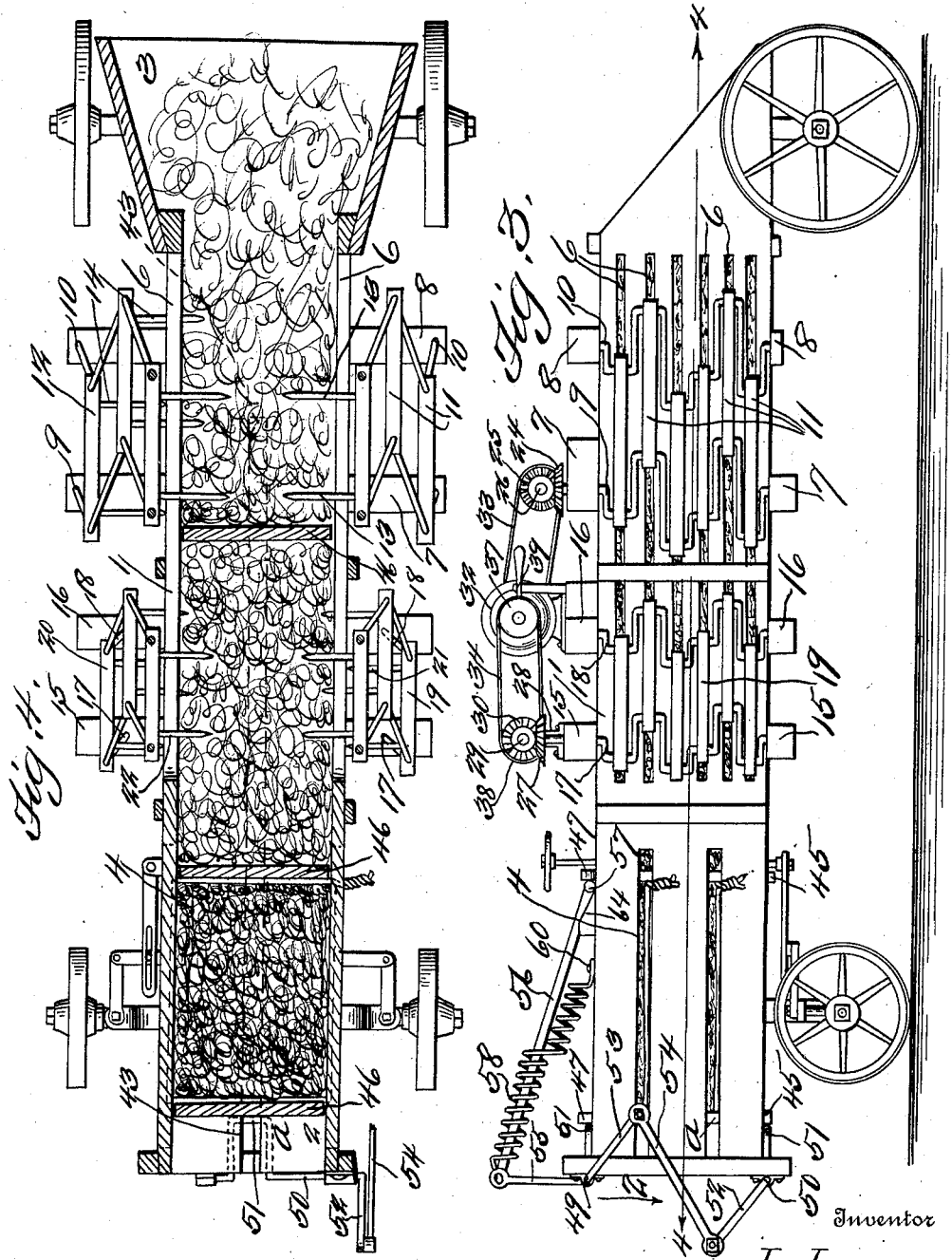

J. JAMES.
HAY PRESS.
APPLICATION FILED JAN. 6, 1912.
1,043,598.
Patented Nov. 5, 1912.
4 SHEETS—SHEET 3.
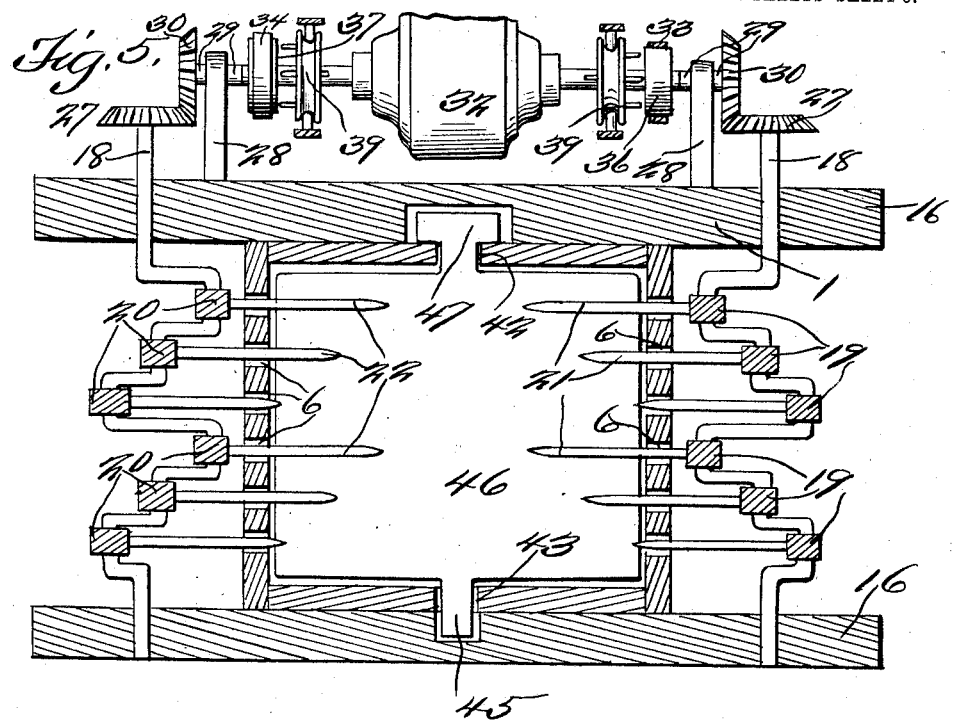
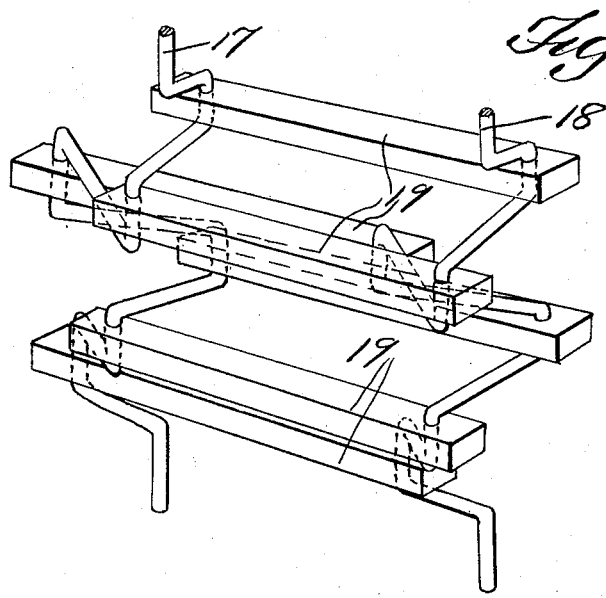
Witnesses
Francis G. Boswell,
C. E. Frothingham,
Inventor
J. James,
By D. Swift &C.
Attorneys

J. JAMES.
HAY PRESS.
APPLICATION FILED JAN. 6, 1912.

1,043,598.

Patented Nov. 5, 1912.

4 SHEETS—SHEET 4.

Witnesses
Francis G. Boswell
C. E. Frothingham

Inventor
J. James
By D. Swift &Co.
Attorneys

UNITED STATES PATENT OFFICE.

JOLLY JAMES, OF KENNEY, ILLINOIS.

HAY-PRESS.

1,043,598. Specification of Letters Patent. Patented Nov. 5, 1912.

Application filed January 6, 1912. Serial No. 669,825.

*To all whom it may concern:*

Be it known that I, JOLLY JAMES, a citizen of the United States, residing at Kenney, in the county of Dewitt and State of Illinois, have invented a new and useful Hay-Press; and I do hereby declare the following to be a full, clear, and exact description of the invention, such as will enable others skilled in the art to which it appertains to make and use the same.

This invention relates to a new and useful baling press.

The principal object of the invention is to provide an improved device of this nature, in which novel features are involved.

One of the features of the invention is the provision of multiple crank shafts, the cranks of which are provided with bars having fingers adapted to penetrate the sides of the baling press casing, for feeding the hay to the baling chamber.

Another feature of the invention is the provision of plates, one of which is held adjacent the outer end of the bale chamber by improved holding means, to act as an abutment for the hay as it is baled. Another plate is then fed through the casing, that is, when the bale has reached the desired size, until it is about to actuate a releasing arm of the holding means, so as to release the first plate. The bale is then tied in the usual manner, after which the first plate is released and the bale discharged, by reason of the fact that the second plate is moved forward by the hay in the rear thereof, until it actuates the releasing arm of the holding means.

The invention comprises further features and combination of parts, as hereinafter set forth, shown in the drawings and claimed.

Figure 8:
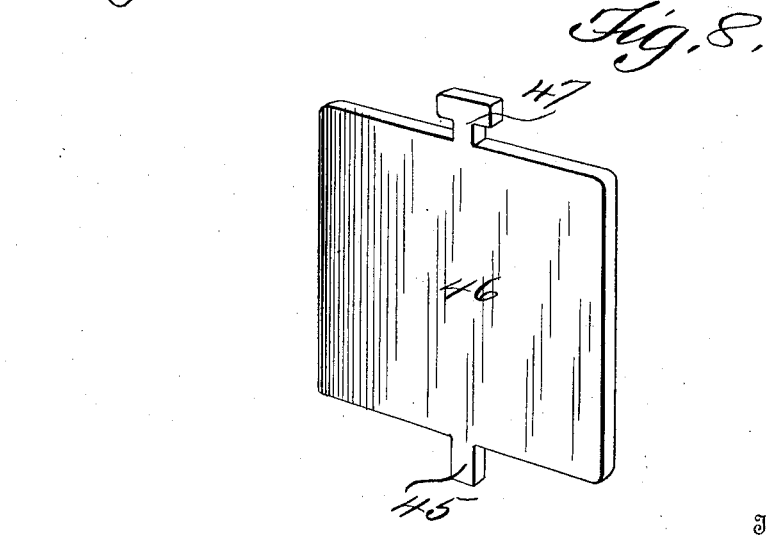

In the drawings:—Figure 1 is a plan view of the baling press constructed in accordance with the invention. Fig. 2 is a sectional view on line 2—2 of Fig. 1, showing one of the plates just in the act of being released, so that the bale may be discharged. Fig. 3 is a side elevation of the press. Fig. 4 is a sectional view on line 4—4 of Fig. 3. Fig. 5 is a cross sectional view on line 5—5 of Fig. 1. Fig. 6 is a detail perspective view of two of the crank shafts showing the bars having the fingers connecting between the shaft. Fig. 7 is a detail perspective view of the holding means for one of the plates. Fig. 8 is a detail view of one of the plates.

Referring to the drawings 1 designates the baling press casing having an outlet end 2 and an enlarged hay receiving mouth 3. The casing is provided with a baling chamber where the bale, when it reaches the desired size, is tied. Between the baling chamber 4 and the hay receiving mouth, the sides of the casing are provided with a plurality of slots 6, through which the feeding fingers penetrate, for feeding the hay forward. A little beyond the hay receiving mouth bars 7 and 8 extend transversely of the casing, two above and two below. These bars extend beyond the casing upon each side thereof. Mounted in the extended portions of the bars 7 and 8 are the crank shafts 9 and 10. Connecting the cranks of the shafts 9 and 10 are the link bars 11 and 12, from which the main feeding fingers 13 and 14 project. These feeding fingers 13 and 14 extend toward the casing, and are adapted to penetrate the slots 6 alternately, so as to feed the hay forwardly of the casing.

Extending transversely of the casing, two above and two below are the bars 15 and 16, in the projecting ends of which the shafts 17 and 18 are journaled. These shafts are provided with cranks similar to the cranks of the shafts 9 and 10 with the exception that they are shorter. Link bars 19 and 20 connect between the cranks of the shafts 17 and 18. The link bars 19 and 20 are provided with feeding fingers 21 and 22, which are shorter than the fingers 13 and 14. The feeding fingers 21 and 22 constitute the final feeders for feeding the hay forwardly.

Upon the upper ends of the shafts 9 bevel gears 24 are provided, which mesh with the bevel gears 25 of the shaft 26. On the upper ends of the shafts 17 bevel gears 27 are secured. Mounted in suitable bearings 28 of the baling press casing is a shaft 29, on each end of which a bevel gear 30 is arranged. The bevel gears 30 mesh with the bevel gears 27. The shaft 26 is also mounted in suitable bearings 31.

Any suitable power may be belted to the shafts 29 and 26. In practice the patentee contemplates utilizing a gasolene engine, which may be mounted on the casing of the hay press.

For illustrative purposes, a conventional form of electric motor 32 is mounted on the casing. This motor is belted to the shafts 26 and 29, by means of the belts 33 and 34 and the pulleys 35 and 36, and 37 and 38, for furnishing power to the shafts 26 and 29. A conventional form of clutch mechanism 39 is provided, for throwing each of the pulleys 36 and 37 out of gear.

The upper portion of the casing adjacent the bar 7 is provided with a transverse slot 40. The upper and lower wall of the casing of the press are provided with longitudinal slots 42 and 43. The longitudinal slot 42 adjoins the slot 40. The slot 43 is designed to receive the tongues 45 of the plates 46, while the slot 42 is designed to receive the T-shaped tongues 47.

Mounted in bearings at the outlet end of the casing, one above and one below are crank shafts 49 and 50, the cranks 51 of which act as abutments for one of the plates 46. The shaft 50 is provided with a single crank arm 52, between which and the arm 53 of the shaft 49 a link 54 is connected. Pivoted to the arm 55 of the shaft 49 is a rod 56, one end of which is provided with a laterally extending portion 57, which is disposed above and transversely of the slot 42 of the casing. A coil spring 58 is mounted on the rod 56, one end of which spring is connected adjacent the pivot between the rod 56 and arm 55, while the other end of the spring is connected at 60 to the casing.

In operation the hay is thrown on a feeding drag at the hay receiving mouth of the press, which feeding drag 62 carries the hay into the mouth of the press. After the hay passes through the mouth it is caught by the feeding fingers 13 and 14 and forced forward of the casing, and then caught by the fingers 21 and 22 and forced forwardly of the bale chamber against the plate 46 arranged at *a* at the end of the baling chamber against the cranks 51 of the shafts 49 and 50. After the bale has reached the desired size, by feeding the hay in this manner, a second plate is dropped through the slot 40 of the casing, until the tongue 45 enters the slot 43, while the T-shaped tongue 47 is received in the slot 42. This second plate is fed forward, partly by the fingers, and then by reason of the hay in the rear thereof being fed forward. When the second plate is about to contact with the lateral projection 57, the feeding fingers are stopped, then the bale is tied in the usual manner. After the bale is tied the feeding fingers 13 and 14 are again operated, which forces the hay in the rear of the second plate farther forward until the T-shaped tongue 47 contacts with the lateral projection 57 of the rod 56. When the tongue contacts with the projection 57 the rod 56 is reciprocated in the direction indicated by the arrow in Fig. 2, which rocks the shafts 49 and 50, so as to throw the cranks from the path of the first plate, thus allowing the plate to fall from the outlet end of the press. When the rod 56 is moved in the direction of the arrow in Fig. 2, the end having a projection 57 is raised by the cam 64, so as to permit the projection 57 to escape the T-shaped tongue 47 of the second plate. As the hay in the rear of the second plate moves farther forwardly, the second plate contacts with the abutment cranks 51 of the shafts 49 and 50, then the operations just related are again repeated as often as necessary.

The invention having been set forth, what is claimed as new and useful is:—

1. In a baling press including a feeding mechanism, abutment crank members, one above and one below at the outlet end of the press, connections between the members, and a head plate actuated means for throwing the cranks of the members from the path of a head plate.

2. In a baling press including a casing and a feeding mechanism, the casing having upper and lower guides, crank abutments at the end of the guides, a head plate in the guides against the abutments, a head plate actuated means for throwing the abutments from the path of the head plate, and connections between the abutments whereby they may be actuated simultaneously.

3. In a baling press including a bale chamber, crank abutments at the outlet end of the chamber one above and one below, the abutments having means for causing them to operate simultaneously, and a head plate mechanism for throwing the abutments from the path of a head plate.

4. In a baling press including a bale chamber, rock shafts including abutments at the end of the bale chamber one above and one below, connections between the shafts, and a head plate actuated means for operating the shafts to throw the abutments from the path of a head plate.

5. In a baling press, a casing including a bale chamber and a feeding mechanism, the bale chamber having guides, one above and one below, head plates in the guides, crank shafts at the end of the bale chamber having connections whereby the two may operate simultaneously, the crank shafts having abutments disposed at one end of each of the guides, a head plate actuated means for rocking the shafts whereby the abutments may be thrown from the path of one of the head plates, and means for throwing the first means from the path of a second head plate so as to permit it to pass.

6. In a baling press including a bale chamber, rock shafts including abutments at the end of the bale chamber one above and one below, connections between the shafts, and a head plate actuated means for operating the shafts to throw the abutments from the path of a head plate, and a device in the path of the means for throwing the same from the path of a second head plate to permit it to pass.

7. In a baling press, a baling chamber having upper and lower guides, a head plate therein having a tongue to enter the lower guide and provided with an upper T-shaped tongue to enter the upper guides.

8. In a baling press having a bale chamber, head plates therein, abutment crank members therefor, and means actuated by one head plate to throw the members from the path of the other head plate.

9. In a baling press having a bale chamber, head plates therein, abutment crank members therefor, and means actuated by one head plate to throw the members from the path of the other head plate, and a device in the path of the means for throwing the means out of the path of the first head plate.

10. In a baling press having a bale chamber, head plates therein, abutment crank members therefor, and means including a device in the path of said means and actuated by one head plate for releasing the preceding head plate.

In testimony whereof I have signed my name to this specification in the presence of two subscribing witnesses.

JOLLY JAMES.

Witnesses:
J. J. MEAGHER,
PETER PETERSON.

Copies of this patent may be obtained for five cents each, by addressing the "Commissioner of Patents, Washington, D. C."